P. T. WHITE & G. ROBERTSON.
TILTING APPLIANCE FOR DECANTING OILS AND LIQUIDS.
APPLICATION FILED SEPT. 8, 1909.
957,829.
Patented May 10, 1910.
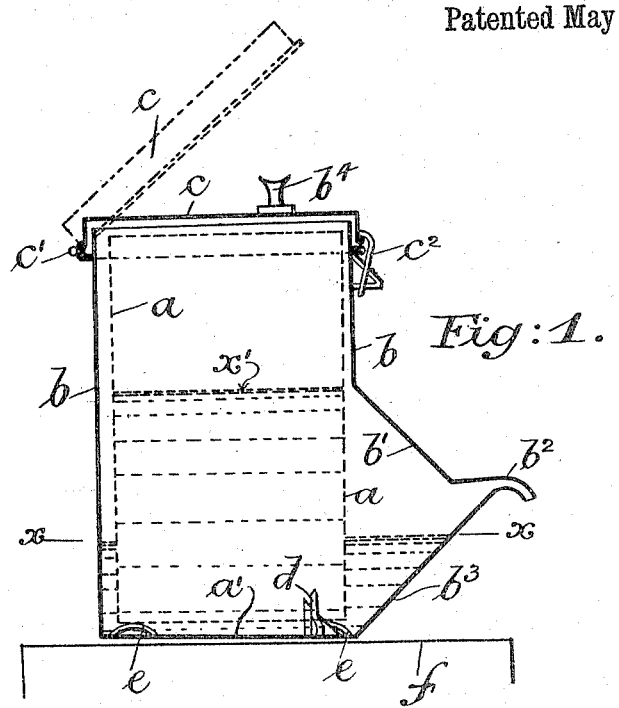
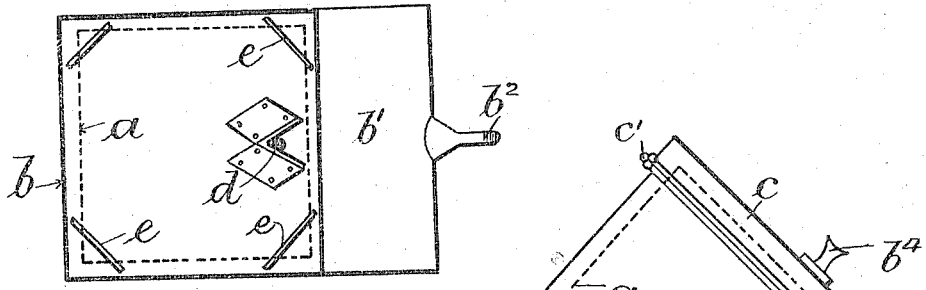
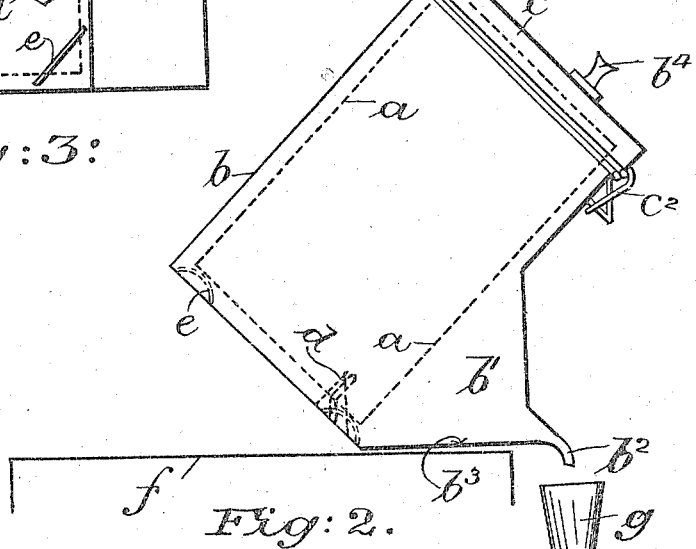
Witnesses:
Inventors
Percival T. White
George Robertson
by James L. Norris atty.

UNITED STATES PATENT OFFICE.

PERCIVAL THOMAS WHITE AND GEORGE ROBERTSON, OF PERTH, WESTERN AUSTRALIA, AUSTRALIA.

TILTING APPLIANCE FOR DECANTING OILS AND LIQUIDS.

957,829.  Specification of Letters Patent.  Patented May 10, 1910.

Application filed September 8, 1909. Serial No. 516,703.

*To all whom it may concern:*

Be it known that we, PERCIVAL THOMAS WHITE and GEORGE ROBERTSON, subjects of the King of Great Britain, residing at Perth, Western Australia, and Commonwealth of Australia, have invented certain new and useful Improvements in Tilting Appliances for Decanting Oils and Liquids, of which the following is a specification.

The object of the present invention is the production of an appliance whereby vessels may be decanted of their liquid contents by a gentle motion, so as not to spill or forcibly eject such contents, the appliance being designed primarily for use in conjunction with kerosene and other oil cans, where an intermittent discharge is desired.

Briefly described, the appliance comprises a stand or casing wherein the can is inclosed, said stand or casing being formed with a forwardly projecting chamber having a pouring spout, the front wall of this chamber being set at an incline to the bottom of the stand. The bottom of the stand is provided with cutters which pierce the can when placed therewithin, thus permitting the contents of the can to flow into said chamber.

A structural embodiment of the invention is illustrated in the accompanying drawings, wherein:

Figure 1 is a vertical sectional view showing the appliance in its normal position. Fig. 2 is a side elevation of the appliance in its tilted position. Fig. 3 is a plan view of the appliance with its cover removed.

Reference being had to said drawings, and to the letters marked thereon, $a$ indicates the oil or other can from which the liquid is to be decanted, said can being shown in dotted lines, and $b$ the hollow stand or casing wherein the can is placed. This stand or casing is formed with a forwardly projecting chamber $b'$ having a pouring spout $b^2$. The front wall $b^3$ of the chamber is set at an angle to the bottom of the stand, as originally stated. The shape of the stand conforms to that of the can, as will be understood. To the top of the stand there is hinged at $c'$ a dust-proof cover $c$ provided with a suitable catch $c^2$ by means of which it may be retained in closed position. There is also provided upon this cover a handle $b^4$.

The bottom $a'$ of the stand is provided with upstanding projections $e$, which serve to support the can above said bottom, and also with an upstanding sharpened member $d$ designed to puncture the can bottom, so as to permit the liquid contents of the can to flow therebeneath into the chamber $b'$. In the present instance, the piercing member is shown as in the form of a spike or spearhead. The stand itself may be supported upon a suitable table $f$, as shown in Figs. 1 and 2, adjacent which table is disposed the receptacle $g$ to be filled.

The appliance is used as follows: The cover $c$ having been raised, a full can is placed within the stand, so as to rest upon the projections $e$ and member $d$, the latter being caused to puncture the can bottom by the weight of the can, whereupon the liquid will flow out through the punctures thus formed and into the stand and its chamber $b'$. The outflow from the can being controlled by the volume of liquid therewithin and by the atmospheric pressure within the stand, (the cover having been closed immediately after the can has been inserted within the stand, as will be understood), an equilibrium will be set up, the initial level of the liquid within the can being designated by the letter $x'$ and that of the liquid within the stand and its chamber by the letter $x$. The stand may then be tilted gradually by means of its handle $b^4$ until its chamber side $b^3$ rests upon the table $f$, in which position it constitutes a support for the stand during the continuation of the decanting operation. When such operation is completed, the stand is returned to its original or upright position, whereupon the chamber will be automatically refilled until its new level is reached, this change in level being due to the discharge of the liquid incidental to the preceding decanting. When the new level is reached, a seal against further discharge from the can into the stand and chamber will be effected.

We claim as our invention:

An appliance for decanting liquids comprising a hollow stand having a forwardly-projecting chamber opening into the interior thereof, said chamber being provided with a pouring spout and having a flat inclined side constituting a support for the stand during the decanting operation, and means located within said stand for puncturing the can when the latter is inserted therewithin, to permit the liquid to flow into said chamber.

In testimony whereof we have hereunto set our hands in presence of two subscribing witnesses.

PERCIVAL THOMAS WHITE.
GEORGE ROBERTSON.

Witnesses:
RICHARD SPARROW,
SAMUEL HERBERT LEVY.